April 25, 1950
E. E. WEMP
2,505,449
TRANSMISSION
Filed June 23, 1945
4 Sheets-Sheet 1
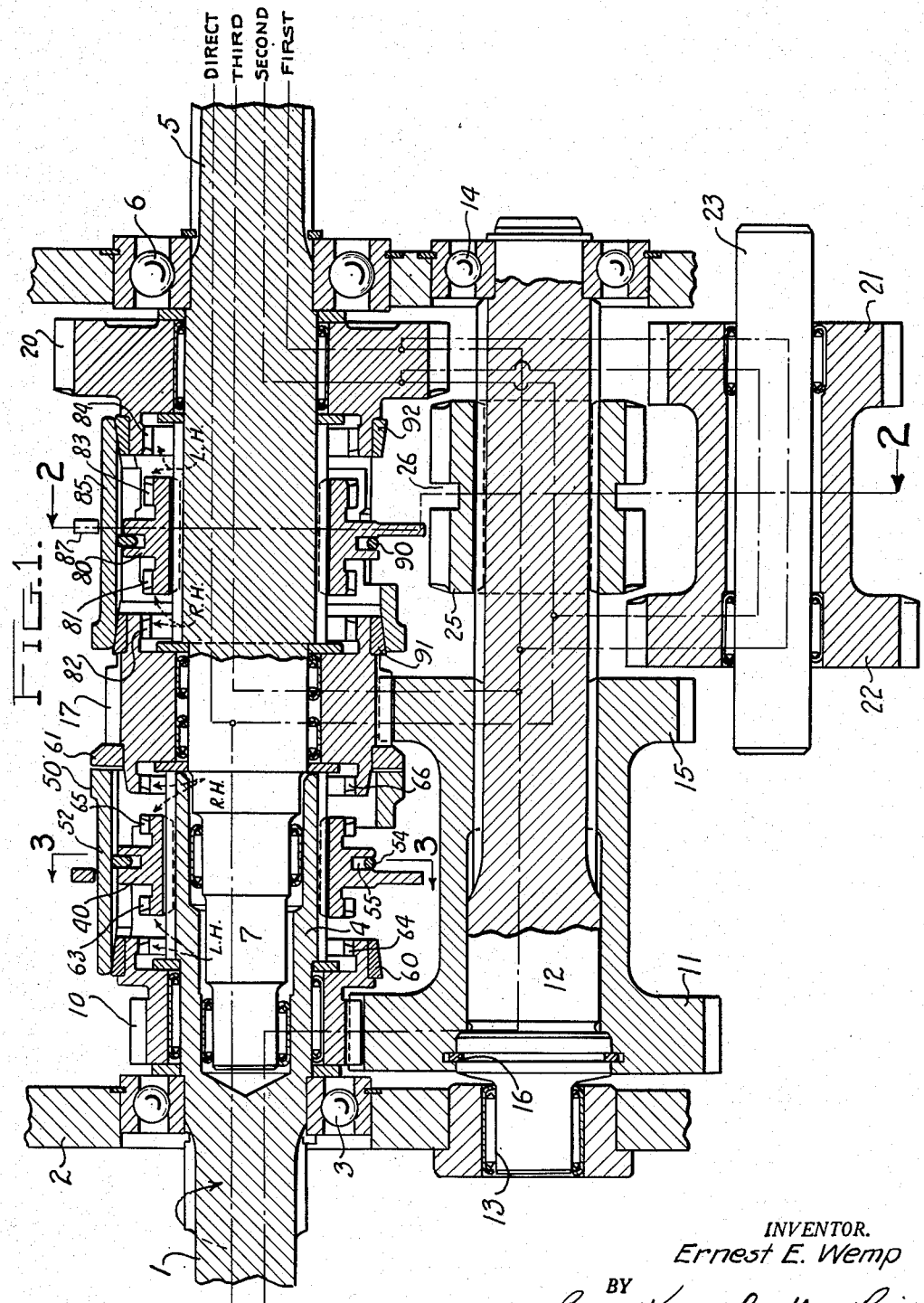
INVENTOR.
Ernest E. Wemp
BY
Barnes, Kisselle, Loughlin & Raisch
Attorneys April 25, 1950     E. E. WEMP     2,505,449
TRANSMISSION
Filed June 23, 1945     4 Sheets-Sheet 2
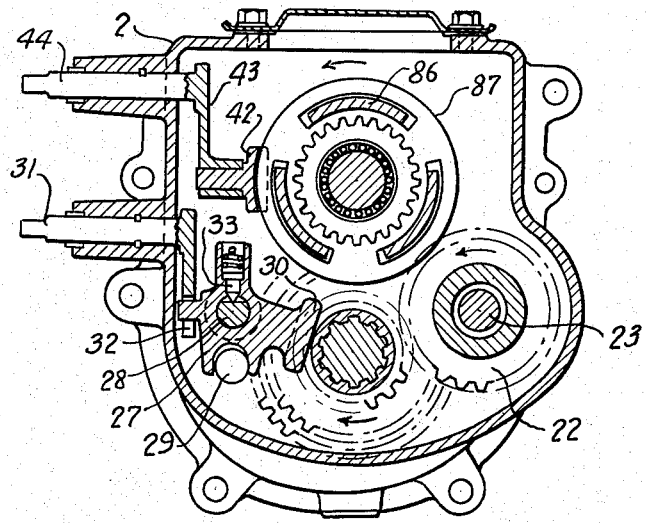
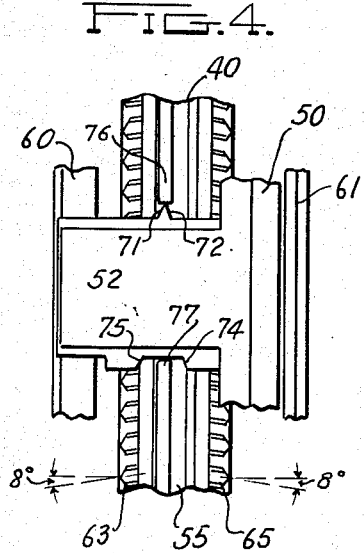
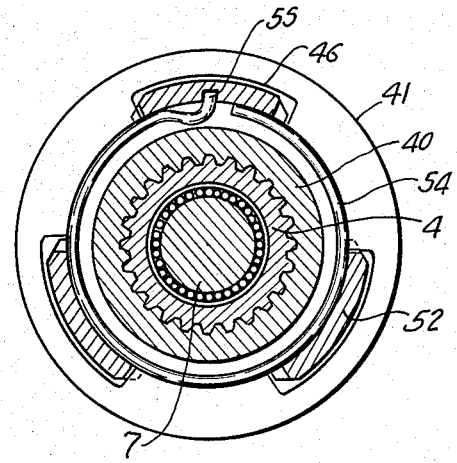
INVENTOR.
Ernest E. Wemp
BY
Barnes, Kisselle, Laughlin & Raisch
Attorneys

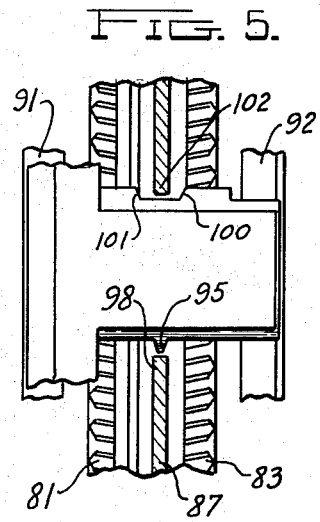
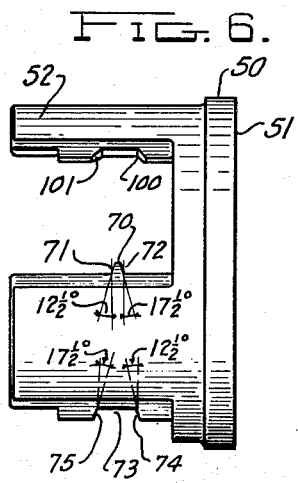
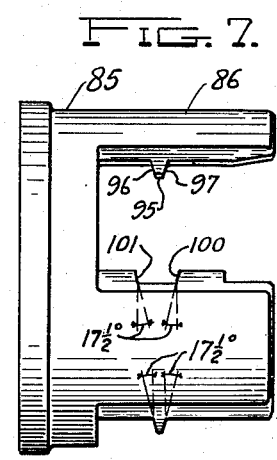
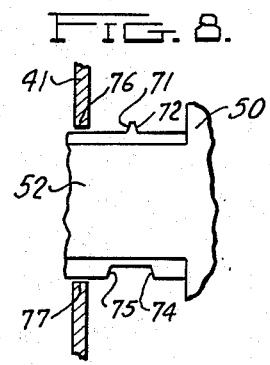
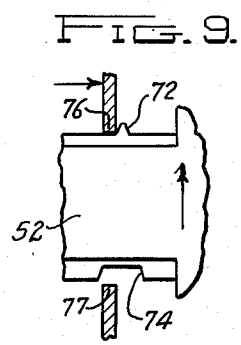
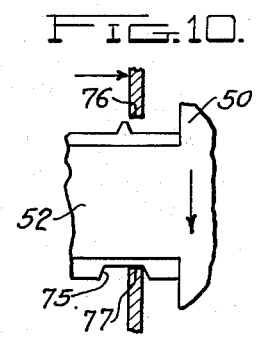
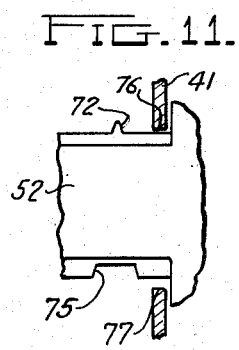
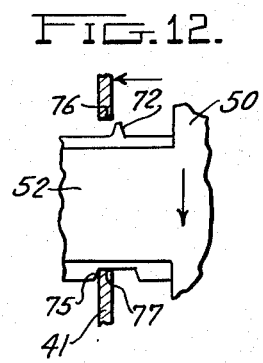

April 25, 1950 E. E. WEMP 2,505,449
TRANSMISSION

Filed June 23, 1945 4 Sheets-Sheet 4

INVENTOR.
Ernest E. Wemp
BY
Barnes, Kisselle, Laughlin & Raisch
Attorneys

Patented Apr. 25, 1950

2,505,449

UNITED STATES PATENT OFFICE 2,505,449

TRANSMISSION

Ernest E. Wemp, Detroit, Mich., assignor of five per cent to Eleanor May Wemp, Los Angeles, Calif.; five per cent to Leah Kathleen Smith, five per cent to Clyde J. Smith, and twenty per cent to Lila A. Wemp, all of Detroit, Mich.

Application June 23, 1945, Serial No. 601,171

7 Claims. (Cl. 74—333)

This invention relates to a transmission for selectively establishing different driving ratios between driving and driven members. The invention is concerned particularly with a transmission suitable for automotive vehicles although the transmission may be used in other places.

Among the objects of the invention is to provide an improved selective transmission wherein a plurality of power coupler units are organized in a single transmission assembly. The power coupler unit referred to is one of the type shown in my co-pending application Serial No. 584,695, filed March 24, 1945, now Patent No. 2,441,174 issued May 11, 1947. The power coupler embodies dentally engaging parts where, for example, a shiftable coupler member may be moved into and out of dental engagement with other elements which normally rotate at different speeds and the operation can be accomplished without otherwise breaking or disrupting the power transmission line. In other words, the coupler element may be shifted, for example, out of dental engagement with a driving element which rotates at a relatively high R. P. M. into dental engagement with an element which rotates at a relatively low R. P. M. and the acts of dentally disengaging and engaging take place substantially when the parts are synchronized. Where the transmission is interposed between the engine and the traction wheels of a vehicle the relative speeds of the transmission parts may be controlled in an easy manner by the engine throttle.

To the end of providing an adequate number of gear ratios, the invention aims to provide a mechanism wherein a plurality of such power units are inter-associated and combined in a single transmission mechanism. For example, as shown herein, two power coupling units are organized in a transmission with an otherwise simplified construction employing a minimum number of gears. Four forward speeds for the vehicle and two reverse speeds can be attained. The objects or advantages of the invention will be more clearly appreciated as the following detailed description is followed in conjunction with the accompanying drawings:

Fig. 1 is a cross sectional view taken through a transmission constructed in accordance with the invention showing one of the gear clusters displaced from its normal position for purposes of clearness.

Fig. 2 is a sectional view on a smaller scale taken substantially on line 2—2 of Fig. 1.

Fig. 3 is a sectional view taken substantially on line 3—3 of Fig. 1 illustrating the structure of one of the power couplers.

Fig. 4 is a developed plan of one of the couplers illustrating the coupler teeth and some of the blocker mechanism which controls the time when dental engagements are made.

Fig. 5 is a developed plan similar to Fig. 4 illustrating the other power coupler.

Fig. 6 is an elevational view of the blocker element of one of the couplers.

Fig. 7 is a view similar to Fig. 6 showing the blocker element of the other coupler.

Figs. 8 to 11 inclusive show the sequence of relative positions of the blocking elements of one coupler when a shift is made in one direction; Fig. 8 shows a coupled position; Fig. 9 shows an intermediate blocked position; Fig. 10 shows a second intermediate blocked position; Fig. 11 shows a coupled position.

Fig. 12 is a view illustrating the relative positions of the parts of one coupler when a shift is made in the opposite direction.

Figure 13:
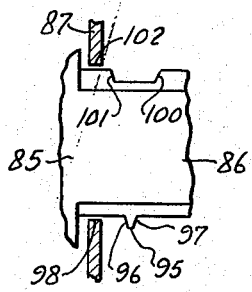
Figure 14:
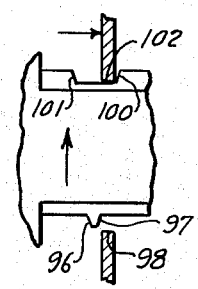
Figure 15:
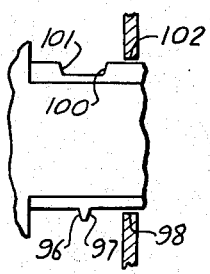

Figs. 13, 14 and 15 are views showing the relative position of blocking parts of the second power coupler when a shift is made in one direction; Fig. 13 shows a coupled position; Fig. 14 shows an intermediate blocking position; and Fig. 15 shows the other coupled position.

Figure 16:
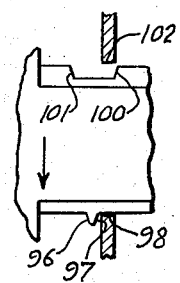
Figure 17:
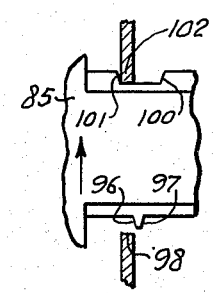
Figure 18:
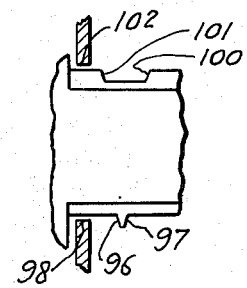

Figs. 16, 17 and 18 are views showing the relative position of blocking parts as a shift is made in the opposite direction of the second coupler; Fig. 16 shows an intermediate blocking position; Fig. 17 shows another intermediate blocking position; and Fig. 18 shows a coupled position which is the same as Fig. 13.

As above mentioned, the transmission comprises a plurality of power coupler units organized into a single assembly and as illustrated herein two power couplers are shown. In Fig. 1 the driving shaft is illustrated at 1. This shaft may be connected to the engine of an automotive vehicle through the means of a suitable clutch. The transmission housing is generally illustrated at 2 and the shaft 1 is journalled therein as at 3. A number of the parts are journalled or piloted upon or in each other through the means of suitable bearings such as anti-friction bearings of the needle roller type. These are shown in Fig. 1 but since such construction is readily appreciated by those skilled in the art, we shall not burden the description herein with a detailed explanation of such construction. Various securing and holding snap rings are also illustrated but the illustration speaks for itself. The end of the drive shaft 1 which projects within the housing is of hollow or tubular form as shown at 4 and a driven shaft 5 which is journalled in the housing as at 6 has its inner end as at 7 piloted in the driving shaft 1.

There is a coupling element 10 in the form of a gear journalled upon the driving shaft and the teeth thereof mesh with the teeth of a gear 11 splined to a countershaft 12 which is journalled in the housing at its ends as illustrated at 13 and 14. The gear 11 may be part of a gear cluster and integral with a gear 15. This gear cluster may be slipped onto the shaft with a spline connection as illustrated and held in position by a snap ring 16 situated in cooperating grooves in the gear cluster and the countershaft. The teeth of gear 15 mesh with the teeth of a gear 17 and the gear 17 constitutes a coupling element for both power couplers as will presently appear. The gear 17 is journalled on the driven shaft as illustrated. Another gear 20 is journalled on the driven shaft and it constitutes a coupling element for one of the power couplers.

There is another gear arrangement in the transmission which takes the form of a gear 21 which may be integral with a gear 22 journalled on shaft 23. This shaft is displaced from its normal position as Fig. 1 is viewed so that it can be seen. The teeth of gear 21, however, are in constant mesh with the teeth of gear 20. The true location of the shaft 23 may be seen by reference to Fig. 2. Slidably mounted upon the countershaft 12 is a gear 25, the teeth of which may be brought into mesh with the teeth of gear 20 and with the teeth of gear 22. As illustrated in Fig. 1, the gear 25 is in a neutral position. This gear has a circumferential groove 26 and its sliding action may be controlled by a member 27 slidable upon a rod 28, held stabilized by a rod 29 and having a shoe 30 positioned at the groove 26. The sliding movement of member 27 may be controlled by the means of a rocker member 31 journalled in the housing 2 and having an arm 32 connected to the slide member 27. The slide member 27 may be held in any one of the three positions by the means of a suitable detent 33.

Before proceeding with the further description, the several paths of the transmission of torque through the transmission may be traced. In first or low speed, the torque is transmitted through gear 10 to gear 11 to the countershaft 12 through gear 25 to gear 20. In the second speed, the torque is transmitted through gear 17, gear 15, countershaft 12, gear 25 to gear 20. In the third speed, the torque is transmitted through gear 10, gear 11, gear 15, and gear 17. In fourth speed or direct drive, the torque is transmitted directly from the driving shaft 1 to gear 17 to the driven shaft 5. The power couplers function to selectively connect the gears, which are also coupling elements, 10, 17 and 20 to the driving and driven shafts. In this connection, gear 17 is sometimes coupled to the driving shaft and sometimes coupled to the driven shaft and, for direct drive, it is coupled to both shafts. The power lines with the associated indicia on Fig. 1 illustrates the paths of torque transmission.

For reverse speeds, the gear 25 is shifted into dental engagement with the gear 22. Thereupon the driven shaft 5 is operated in reverse by torque transmitted by the countershaft 12 through gear 25 to gear 22 and through gear 21 to gear 20. When thus coupled in reverse, the countershaft may be connected to the driving shaft 1 through the gear 10 or gear 17 as elected, thus providing two reverse ratios. In forward speeds, when the gear 25 is coupled to gear 20 the gears 21 and 22 merely operate idly.

Taking up now, for consideration, the power coupler mechanism associated with the gear elements 10 and 17; there is a coupler 40 positioned between these gears and splined to the enlarged hollow portion of the drive shaft so that it may be shifted axially. These splines are straight in the sense that they parallel the shaft axis. This coupler has a flange 41 arranged to be engaged by control means for shifting the same. Such a control means is illustrated in Fig. 2 and is in the form of a shoe 42 engaging the periphery of the flange and carried by a lever arm 43 mounted on a control rocker shaft 44. Any suitable control means for manual or automatic operation may be connected to the control rock shaft 44. The flange is apertured and as shown in Fig. 2, is provided with three of such apertures illustrated at 46.

Mounted over the coupler is a blocking element generally indicated at 50 (Fig. 6). This blocking element has a ring-like body structure at one end with a face 51 which advantageously and preferably is radial, while projecting therefrom are three extensions or fingers 52 which pass through the apertures in the flange. The coupler and the blocking element 50 are slidably and yieldably associated with each other as by the means illustrated in Fig. 3. This means takes the form of an expanding spring 54 positioned in a groove 55 of the coupler and frictionally engaging the inner surfaces of the fingers 52 of the blocker. One end of the spring is turned outwardly and engages in a slot or key way in the blocker element as shown at 55.

The ends of the fingers of the blocker element are to frictionally engage the gear 10. To this end, the gear 10 has an extending portion and the engagement is preferably through the means of suitable material for friction purposes, such as the ring 60 mounted upon the gear 10. The ring 60 has a conical surface for such engagement as illustrated. The face 51 is for frictional engagement with the gear 17 for which purpose a ring of suitable friction material 61 is mounted upon the gear 17.

The coupler has two sets of teeth for dental engagement respectively with corresponding teeth on the gears 10 and 17 as shown in Fig. 4. One set of teeth is illustrated at 63. As will be noted, these teeth are helically disposed in a left hand manner. The extension on the gear 10 has a corresponding set of teeth also helically disposed in a left hand manner for dental engagement with the teeth 63. These teeth are illustrated at 64. Due to the helical disposition of the teeth 63 and 64 they move into dental engagement with a slight relative twisting or screw action between the gear 10 and the coupler 40. The other set of teeth on the coupler are illustrated at 65 and these are disposed on a right hand helix and are for dental engagement with a cooperating set of teeth 66 also on a right hand helix and disposed on the gear 17.

The member 50 and the flange of the coupler have cooperating engaging blocking elements. Each finger of the member 50, as shown in Fig. 6, has a blocking projection 70 with opposite blocking shoulders or faces. One face 71 may be disposed at about 12½° from the plane of rotation as illustrated, while the other face 72 may be disposed at about 17½°. On the opposite edge, the finger is provided with a recess 73 with a blocking face 74 advantageously disposed at about 12½° and a blocking face 75 disposed at about 17½°. The metal of the flange constituting the ends of the slots 46 also constitute blocking faces or shoulders and are respectively indicated at 76 and 77 (Fig. 4). These blocking faces on the blocking element 50 engage and prevent movement of the coupler axially under certain conditions, which conditions are those of relative rotation. This can probably be best appreciated by a description of the operation of the power coupler.

In Fig. 1 the power coupler which includes the coupler 40 is shown in a neutral position. However, it will be readily appreciated that as it is shifted to the left as Fig. 1 is viewed, the teeth 63 and 64 may be dentally engaged; when the coupler is shifted to the right the teeth 65 and 66 may be engaged. Let it be assumed that the teeth 63 and 64 are dentally engaged and let it be assumed later that torque is being transmitted. The torque line extends from the shaft 1 through the coupler 40 through the dentally engaged teeth 63 and 64, thus driving the gear 10 and the torque is transmitted from the gear 10 back through the transmission to the driven shaft 5. For this purpose, let it be assumed that the gear 20 is coupled to the shaft 5 in a manner as will presently be described. This then, is a condition which corresponds to first or low speed as above described.

If it is desired, to shift the coupler 40 into position where the teeth 65 and 66 become dentally engaged, an axial operating force is applied to the flange 41. Preferably, the arrangement is such that the combined loads on the splined connection between the shaft 1 and the coupler 40 and on the dentally engaging teeth 63 and 64 are such that the friction involved prevents shift of the coupler so long as a substantial amount of torque is being delivered. However, as the accelerator on the engine is released to cut the power of the engine the transmission of engine torque to the driven member substantially ceases and the axial load causes the coupler 40 to shift to the right to disengage the teeth 63 and 64. At this moment the coupler is rotating faster than the gear 17 because the coupler is rotating at engine speed and gear 17 at a reduced speed due to the reduction provided by gears 11 and 15. The left hand helix of the teeth 63 and 64 tend to cause the dental engagement to accept while torque is being transmitted by the engine shaft, the direction of rotation being that as shown by the arrow in Fig. 1. Upon torque reversal, however, the helix angle tends to cause the dental engagement of teeth 63 and 64 to reject. As the coupler shifts to disestablish the dental engagement the frictional engagement of spring 54 on the blocker element 50 shifts the blocker element to the right and into frictional engagement with the member 61.

This frictional engagement causes the blocker element 50 to shift rotatably relative to the coupler to bring blocking agencies into action. When the parts were engaged the relative position of the blocking agencies were as shown in Fig. 8. The relative motion reaction shifts the blocking element 50 to a position as demonstrated in Fig. 9 where the blocking element 76 abuts against the blocking face 71. This prevents further movement of the coupler. This condition will be maintained so long as this relative motion reaction persists, and the coupler is in an intermediate position disengaged from both the gear 10 and the gear 17. Normally, this condition will not be maintained for a long period since the accelerator of the engine or the power of the engine has been cut and the engine and, therefore the shaft 1 is decelerating. Normally, the engine will decelerate rapidly and when it passes through the point of synchronization with gear 17 and begins to rotate slower than gear 17 the reaction of relative motion is reversed and a condition is set up as shown in Fig. 10. In other words, the blocker element 50 shifts rotatably relative to the coupler 40. The blocking shoulder 77 now abuts the shoulder 74.

This condition will be maintained as long as a condition persists in which the driving member 1 is rotating slower than the gear 17 which is about to be dentally engaged. The coupler is still in an intermediate position disengaged from both gear 10 and gear 17. As the accelerator of the engine is depressed and the speed of the engine and the driving shaft 1 increases the coupler first comes up to a speed substantially in synchronization with the gear 17 and then as the coupler tends to overrun the gear 17 the relative motion reaction, as indicated by the arrow in Fig. 10, ceases and may even reverse or tend to reverse with the result that the shoulder 77 moves out of abutting relationship with the shoulder 74 and the coupler can continue its shift to the right and into dental engagement with the gear 17. The relative position of the parts are now as indicated as in Fig. 11. Thus, the dental engagement is established substantially when the coupler and gear 17 become synchronized. Specifically, the coupling is established just as the coupler starts to overrun the gear 17. All during this action the gear 17 has been positively driven by its connection to the driven shaft 5 which may be connected to the traction wheels of the vehicle or to other driven mechanism and the coupler 40 has been connected to the driving shaft 1 and the engine and, therefore, the parts are under what is termed torque load.

This shift in the transmission is obtained by first applying the axial load to the control flange 41 followed by the simple action of releasing the accelerator and then depressing the accelerator. Now, it may be possible that the coupler will not stop in the blocked position shown in Fig. 10 under certain conditions. For instance, suppose the engine is controlled so that the driving member very slowly decelerates while the parts are in the position as shown in Fig. 9; when the coupler and gear 17 become substantially synchronized with resultant loss of the relative motion reaction shown in Fig. 9, the differential in speed may be such that the coupler will move with continuous motion through the Fig. 10 position to the coupled position shown in Fig. 11. However, this is a perfectly satisfactory and proper operation because the conditions for the establishment of dental engagement are satisfied, namely, substantial synchronization of the two parts about to be dentally engaged.

Now, let it be assumed that the coupler is about to be shifted from dental engagement with the gear 17 to dental engagement with the gear 10. First, an axial force is applied to the flange 41 tending to shift the coupler to the left as Fig. 1 is viewed. When the torque of the engine is sufficiently cut the force will shift the coupler to the left and disestablish the dental engagement between teeth 65 and 66. In this connection, the right hand helix of the teeth 65 and 66 tends to reject the coupler teeth upon torque reversal. The friction afforded by the spring 54 shifts the blocker member 50 to the left so that it frictionally engages the surface member 60. At the moment of disengagement the coupler is rotating slower than the gear 10. Accordingly, there is a reaction caused by this relative motion as indicated in Fig. 12 and the blocker member shifts into the position so that the blocking shoulder 77 abuts the shoulder 75 and thus the coupler is held in an intermediate position disengaged from both gears. This condition will be maintained so long as the driving shaft is rotating slower than the gear 10. The speed of the gear 10 persists fairly constantly because it is coupled to the traction wheels of the vehicle. As the driving shaft is increased in speed as by means of depressing the engine accelerator it will come up to the speed of the gear 10 and as it tends to overrun the same the relative motion reaction as shown in Fig. 12 is lost or reversed with the result that the shoulder 77 moves over the abutment 75 and the coupler shifts to cause dental engagement between the teeth 63 and 64. This takes place when there is a substantial synchronization between the coupler and the gear.

The purpose of having the dentally engaging teeth disposed helically is to provide for movement of the coupler into and out of dental engagement through an interval of time. The coupler shifts on the straight splines on the driving shaft; the dental engagement with the teeth 64 and teeth 66 takes place as the coupler tends to overrun the respective gears. Thus, there is relative rotational movement between the coupler and the gear being dentally engaged and a full torque transmitting coupling is not made until the coupler completes its axial movement and stops.

It will be noted that the blocking surfaces 71, 72, 74 and 75 are angularly disposed and that the surfaces 72 and 75 are not so abrupt as the surfaces 71 and 74. When the parts are in blocking position, as shown in Figs. 9 and 10, they are held in such position by the relative motion reaction incident to the friction between face 51 and element 61. Inasmuch as the angles are relatively steep the frictional action need be relatively light and thus the radial friction faces 51 and 61 suffice. Indeed, these two blocking faces may be perpendicular to the axis although some angularity makes for easing the motion as the blocking action is discontinued thus facilitating movement of the shoulders 76 and 77 over the blocking surfaces.

In the opposite shift where a blocking action takes place as shown in Fig. 12, the abutment shoulder 77 is against the blocking surface 75 which is not so steep and it takes more friction to maintain the relative motion reaction and thus the conical friction face of the member 60 is preferred. If the driving member 1 and, therefore, the coupler should become freed of the engine it can be relatively easily oscillated and the angle of the surface 75 is such that the axial force on the coupler may shift the shoulder 77 over the angular face 75 with cam action causing relative rocking of the coupler and driving member 1 so as to provide dental engagement between the teeth 63 and 64. Thus a coupling will be established if the engine stops and the shaft 1 is freed from the engine as by means, for example, of an automatic clutch. In making the shift of the coupler to the left as Fig. 12 is viewed the blocking face 72 will not function. This is because the relative motion reaction is in the direction of the arrow and the coupler moves past the face 72.

The other power coupler is of similar construction and resides in a coupler 80 mounted on straight splines on the driven member 5 and having teeth 81 for dental engagement with teeth 82 of the gear 17. The teeth 81 and 82 are on a right hand helix. The coupler has teeth 83 for dental engagement with teeth 84 on gear 20 and these teeth are on a left hand helix. Positioned over the coupler is a blocking element 85 (Fig. 7) with projections or fingers 86 which extend through slots in the coupler flange 87. The coupler and blocking element are frictionally associated through the means of a spring 90 and the structure is like that shown in Fig. 3. The blocking element is to frictionally engage the gear 17 and the gear 20 as it is frictionally urged to the right or to the left by the spring 90 incident to shift of the coupler 80, and this is accomplished by suitable friction material. The coupler 80 may be shifted by control means similar to the means 42, 43, and 44 for shifting the coupler 40 as shown in Fig. 2. Accordingly, there is a ring of suitable friction material 91 on the gear 17 and a ring of friction material 92 on the gear 20. As shown herein the structure is such that the frictional engagement is through conical surfaces. Needless to say the friction rings in all cases may be placed upon the blocking elements instead of the several gear elements.

The blocking elements of the second power coupler are of the same nature as the blocking elements previously described except that they are reversed. There is a blocking projection 95 with two blocking faces 96 and 97 for engaging the blocking shoulder 98 constituted by the end wall of the slot in the flange 87. On the opposite side of each finger is a notch having a blocking face 100 and a blocking face 101 for cooperation with the blocking shoulder 102.

It will be noted that in this power coupling, the coupler 80 is mounted upon the driven member 5 and that the gear elements 17 and 20 become driving members with respect to the coupler 80. When the teeth 81 and 82 are in dental engagement the blocking elements are in a relative position as shown in Fig. 13. When an axial force to the right is placed upon the coupler and the engine torque is cut, the coupler moves to the right and disengages the teeth 81 and 82. At this moment, the coupler is rotating at the speed of the element 17 which is faster than the rotation of the element 20. The frictional engagement with the member 92 establishes a relative motion reaction in the direction of the arrow as shown in Fig. 14 and this brings the abutment face 100 into blocking position relative to the abutment 102. As the engine is accelerated the speed of rotation of the gear 20 increases and as it starts to overrun the shaft 5 and the coupler 80 the relative motion reaction is lost or reverses thus releasing the blocking action between the blocking shoulder 100 and blocking shoulder 102 so that the coupler may complete its movement to the right and engage the teeth 83 and 84 substantially at the time of synchronization.

In shifting the coupler 80 from a position of engagement with the element 20 to engagement with the element 17 an axial force to the left is applied to the coupler flange 87 and when the engine torque is cut the coupler moves to the left thus disengaging teeth 83 and 84. At this time the element 17 is rotating faster than the coupler and the frictional engagement of the blocker element 85 with the facing 91 establishes a relative motion reaction as shown in Fig. 16. This positions the blocking shoulder 97 in blocking position relative to the shoulder 98. The engine speed, and therefore the speed of the member 17, is now reduced as by continued relief of the accelerator until the member 17 underruns the blocker element 85 and this reverses the relative motion reaction to a condition as shown in Fig. 17 so that the shoulder 102 is blocked by shoulder 101. Now, upon acceleration of the engine and, therefore, the coupler element 17 the relative motion reaction is again reversed just as the member 17 tends to overrun the coupler 80 and the coupler continues its movement and the teeth 81 and 82 become dentally engaged substantially at the time of synchronization. The blocking parts are now relatively positioned as shown in Fig. 18. The blocking faces 96, 97, 100 and 101 are preferably all of the type which will permit the coupler to move over the same by cam action when the parts are not under load. For example, in shifting the coupler 80 from the position of dental engagement with the gear 20 into dental engagement with the gear 17, as represented by Figs. 15 to 18 inclusive, the coupler 40 may be in disengaged position. Therefore, the gear 17 is not coupled to the engine. To the contrary, the gear 17, the gear 15, the gear 11 and the gear 10 are free. Accordingly, the axial thrust on the coupler, if the parts be in the Fig. 16 position, will cause the shoulder 98 to ride over the shoulder 97 by cam action, thus rocking the blocker 85 and the gear 17 as well as the other free gears connected to gear 17. The same action occurs if the parts assume the position shown in Fig. 12, to the end that the coupler will shift over shoulder 101 by cam action.

It may further be stated that while dental engagement takes place substantially at synchronization the actual action of the teeth moving into engagement with each other takes place during a slight overrunning action of one member relative to the other. The overrunning action aids in shifting the parts into dental engagement due to the helix of the teeth and a torque transmitting coupling is not fully established until axial movement of the coupler ceases thus stopping further overrunning action. In the use of the transmission, four forward speeds can be obtained as above pointed out. When in first or low speed the coupler 40 is shifted to the left, as Fig. 1 is viewed, into dental engagement with the gear element 10 and the coupler 80 is shifted to the right into dental engagement with the gear element 20. The torque is now transmitted through the following path: drive member 1, coupler 40, gear 10, gear 11, countershaft 12, gear 25, gear 20, coupler 80 to driven shaft 5. For second speed, a single shift is required, namely, that of shifting the coupler 40 from its engagement with gear 10 into engagement with gear 17. The torque is now transmitted in the following path: drive shaft 1, coupler 40, gear 17, gear 15, countershaft 12, gear 25, gear 20, coupler 80 to driven shaft 5. For third speed forward, both couplers 40 and 80 are shifted to the left and into alignment with the gear 10 and gear 17 respectively. The torque is now transmitted through the following path: drive shaft 1, coupler 40, gear 10, gear 11, gear 15, gear 17, coupler 80 to driven shaft 5. For fourth or direct speed, the coupler 40 is shifted to the right and into engagement with gear 17. The torque is now transmitted through the following path: drive shaft 1, coupler 40, gear 17, coupler 80, to driven shaft 5. For purposes of brevity, the elements 10, 17 and 20 have been termed gears. They are in reality both gears and coupling elements. In fact, in direct drive the gear 17 serves only as a coupler element and not as a gear except to the extent that it is constantly geared to the gear 15.

It has already been explained how reverse is effected by shifting gear 25 into dental engagement with the gear 22. The torque may be transmitted either through gear 10 or gear 17 to the countershaft and thence through gear 25, gear 22, gear 21, gear 20, coupler 80 to drive shaft 5.

I claim:

1. In a transmission, a driving shaft, a driven shaft, said shafts being on a common axis, first, second and third gear elements journalled on the axis of the shafts and being spaced apart axially with the second gear element in an intermediate position, a countershaft, gear means on the countershaft for connecting the first, second and third gear elements for rotation at different speeds, a coupler slidably connected to the driving shaft and positioned between the first and second gear elements, a coupler slidably connected to the driven shaft and positioned between the second and third gear elements, the couplers and the gear elements having cooperating teeth for dental engagement and disengaged upon axial shift of the couplers, means for shifting the couplers to selectively establish dental engagement of the teeth to effect different ratios between the driving and driven shafts, two sequentially operating blocking means operative by relative motion reaction and effective on the coupler on the driving shaft as it is shifting from engagement with a gear element of relatively high rotation to engagement with a gear element of relatively low rotation, and two sequentially operating blocking means operative by relative motion reaction on the coupler on the driven shaft as the said coupler is moving from engagement with a gear element of relatively low rotation to engagement with a gear element of relatively high rotation.

2. In a transmission, a driving shaft and a driven shaft mounted on a common axis, first, second and third combined gear and coupling elements disposed in axially spaced relationship and each being independently rotatable, gear means for connecting the elements for rotation at different speeds, a coupler slidably connected to the driving shaft between the first and second elements and shiftable axially for selective dental engagement with the first and second elements, a coupler slidably connected to the driven shaft between the second and third elements and shiftable axially for selective dental engagement with the second and third elements, means for shifting the couplers to dentally engage the same respectively with the first and third elements, with the second and third elements, with the first and second elements, and both with the second element for establishing as many driving ratios between the driving and driven shafts, and a blocking means for each coupler operable incident to relative motion reaction for providing two sequentially operating blocking actions as each coupler shifts axially, the second blocking action for both couplers being released substantially upon reversal of relative motion reaction for movement of each coupler into dental engagement with one of the elements.

3. In a transmission, a driving shaft, a driven shaft, gearing including axially spaced combined gear and coupling elements for connecting the shafts together at different speed ratios, a plurality of couplers, each slidably connected to a shaft for axial shift and each disposed between two of said elements, each coupler and its cooperating elements constituting a power coupler adapted to establish a dental coupling while the driving shaft and driven shaft are under torque load, each coupler and its cooperating elements having teeth for dental engagement, the set of teeth for dental engagement with one element being on a left hand helix and a set of teeth for engagement with the other element being on a right hand helix, means for axially shifting the couplings for selective dental engagement with said elements, and two sequentially operating blocking means effective upon each coupler, the first blocking means being operable by relative motion reaction in one direction and the second blocking means being operative by relative motion reaction in the opposite direction, both of said blocking means being releasable when the relative motion reaction is lost by substantial synchronization of the coupler and the element with which the coupler is about to become dentally engaged.

4. In a transmission, a driven shaft, two driving elements arranged so that one rotates relatively fast and the other relatively slow, the elements having teeth for dental engagement, a coupler having teeth for dental engagement with the elements, said coupler being slidably connected to the driven shaft and shiftable axially for selective dental engagement with the elements, means for applying shifting force to the coupler and two sequentially operating blocking means effective upon the coupler in its movement from dental engagement with the slower rotating element into dental engagement with the faster rotating element, the first acting blocking means being operative by relative motion reaction due to rotation of the coupler at a slower speed than the higher rotating elements, the second acting blocking means being operative by relative motion reaction due to rotation of the higher rotating element at a speed lower than the coupler, both of said blocking means being releasable when the relative motion reaction is lost by the substantial synchronization of the coupler and the faster of the rotating elements.

5. In a transmission, a driving shaft, a driven shaft, first and second axially spaced coupling elements which are driven members with respect to the driving shaft, a third coupling element spaced from the second coupling element, the second and third coupling elements being driving members relative to the driven shaft, said elements adapted for different speeds of rotation, a coupler slidably connected to the driving shaft and positioned between the first and second coupling elements, a coupler slidably connected to the driven shaft and positioned between the second and third elements, the couplers and elements having teeth for dental engagement arranged to be engaged and disengaged upon sliding movement of the couplers, blocking means for the coupler on the driving shaft including blocking shoulders and a blocking element associated with the coupler for frictionally engaging the element toward which it is shifted, said blocking means comprising two sequentially operating blocking shoulders operable by relative motion reaction incident to said frictional engagement and operable upon the coupler as it is shifting from dental engagement with the element of higher rotation to dental engagement with the element of lower rotation, and a similar but reversed blocking means for the coupler on the driven shaft having two sequentially operating blocking shoulders acting upon the coupler as it is shifting from dental engagement with the element of lower rotation to dental engagement with the element of higher rotation.

6. In a transmission, a shaft, a coupler slidably connected to the shaft, two coupling elements disposed on opposite sides of the coupler adapted to be selectively dentally engaged with the coupler, means for shifting the coupler, blocking means including a blocking member for frictionally engaging the element toward which the coupler is shifted for setting up relative motion reaction, said blocker member disposed over the coupler, a spring axially fixed relative to the coupler and expanding into frictional engagement with the blocker member for establishing a frictional connection, said blocker member having axially extending fingers, an axially disposed slot on one of the fingers and one end of the spring being fashioned outwardly and slidably disposed in said slot.

7. In a transmission, a driving shaft, a driven shaft, two driving elements, power transmitting means for transmitting torque from the driving shaft to the driving elements so that one element rotates relatively fast and the other element rotates relatively slow, the elements having teeth for dental engagement, a coupler having teeth for dental engagement with the elements, said coupler being slidably connected to the driven shaft and shiftable axially for selective dental engagement with the elements, while the coupler and the elements are under torque load, means for applying shifting force to the coupler and two sequentially operating blocking means effective upon the coupler in its movement from dental engagement with the slower rotating element into dental engagement with the faster rotating element, the first acting blocking means being operative by relative motion reaction due to rotation of the coupler at a slower speed than the higher rotating elements, the second acting blocking means being operative by relative motion reaction due to rotation of the higher rotating element at a speed lower than the coupler, both of said blocking means being releasable when the relative motion reaction is lost by the substantial synchronization of the coupler and the faster of the rotating elements.

ERNEST E. WEMP.

REFERENCES CITED

The following references are of record in the file of this patent:

UNITED STATES PATENTS

| Number | Name | Date |
| --- | --- | --- |
| 1,949,167 | Maybach | Feb. 27, 1934 |
| 2,096,770 | Wagner | Oct. 26, 1937 |
| 2,106,841 | Griswold | Feb. 1, 1938 |
| 2,221,900 | White et al. | Nov. 19, 1940 |
| 2,238,370 | Peterson | Apr. 15, 1941 |

FOREIGN PATENTS

| Number | Country | Date |
| --- | --- | --- |
| 654,882 | Germany | Jan. 3, 1938 |